(12) United States Patent
Bionaz et al.

(10) Patent No.: US 9,885,408 B2
(45) Date of Patent: Feb. 6, 2018

(54) DIFFERENTIAL LOCK ACTUATOR

(71) Applicant: Meritor Heavy Vehicle Systems Cameri SpA, Cameri (Novara) (IT)

(72) Inventors: Davide Bionaz, Cameri (IT); Dario Garbini, Cameri (IT)

(73) Assignee: Meritor Heavy Vehicle Systems Cameri SpA, Cameri (Novara) (IT)

( * ) Notice: Subject to any disclaimer, the term of this patent is extended or adjusted under 35 U.S.C. 154(b) by 0 days.

(21) Appl. No.: 15/291,716

(22) Filed: Oct. 12, 2016

(65) Prior Publication Data
US 2017/0108105 A1 Apr. 20, 2017

(30) Foreign Application Priority Data

Oct. 16, 2015 (EP) .................................... 15190272

(51) Int. Cl.
*F16H 48/06* (2006.01)
*F16H 48/32* (2012.01)
*F16H 48/24* (2006.01)

(52) U.S. Cl.
CPC .............. *F16H 48/32* (2013.01); *F16H 48/06* (2013.01); *F16H 48/24* (2013.01)

(58) Field of Classification Search
USPC .......................................................... 475/86
See application file for complete search history.

(56) References Cited

U.S. PATENT DOCUMENTS

| 4,703,671 | A | * | 11/1987 | Jikihara | .................. F16H 48/08 475/158 |
| 5,342,255 | A | * | 8/1994 | Slesinski | ................. F15B 15/24 475/230 |
| 5,673,777 | A | * | 10/1997 | Ziech | ...................... F16H 48/08 192/108 |
| 6,582,334 | B1 | * | 6/2003 | Noll | ........................ F16H 48/08 475/86 |
| 9,279,468 | B1 | | 3/2016 | Philpott | |
| 2016/0160949 | A1 | | 6/2016 | Philpott | |
| 2017/0045379 | A1 | * | 2/2017 | Mitzel | ..................... G01D 5/147 |

FOREIGN PATENT DOCUMENTS

EP 1731798 A1 12/2006
GB 1468489 A 7/1975

OTHER PUBLICATIONS

European Patent Office, Extended Search Report for the corresponding European Patent Application No. 15190272.3 dated Apr. 22, 2016.

* cited by examiner

*Primary Examiner* — Dirk Wright
(74) *Attorney, Agent, or Firm* — Brooks Kushman P.C.

(57) ABSTRACT

A differential lock actuator with a lock detection assembly. The differential lock actuator has a push rod configured to be movable within a housing between a first position and a second position for activation/deactivation of a differential locking system. The lock detection assembly is adapted to detect a position of the push rod and has a first detector component that is adapted to emit a magnetic field and is attached to and movable together with the push rod.

18 Claims, 4 Drawing Sheets

DIFFERENTIAL LOCK ACTUATOR

TECHNICAL FIELD

This invention relates to a differential lock actuator for a differential locking mechanism, particularly for a differential locking mechanism for vehicles.

BACKGROUND

Vehicle drive axles typically include a pair of axle shafts for driving the vehicles wheels. Under normal conditions, when the vehicle is driven along a straight path, the wheels, and thereby both axle shafts, will be turning at approximately the same speed and the same amount of torque will apply to each wheel. However, once the vehicle starts to turn, the outer wheel covers a greater distance than the inner wheel in the same amount of time. Under these circumstances, the outer wheel will have to rotate faster than the inner wheel in order to avoid slip that causes substantial wear of the tires. For this purpose, the drive axle also includes a differential that distributes input speed and torque to the pair of axle shafts. Differentials allow the inner wheel to turn at a slower speed than the outer wheel as the vehicle turns.

In a commonly known differential, the engine power is transmitted from a vehicle drive-shaft to a pinion gear that engages a crown wheel. The crown wheel is rigidly attached to a gear housing that rotates together with the crown wheel. The gear housing includes four differential pinion gears that split the engine torque provided by the pinion gear between the two axle shafts, allowing the two axle shafts to spin at a different speed.

When the vehicle is driven in a straight path, the crown wheel, gear housing and the differential pinions all rotate together as one unit to distribute the power evenly across the two axle shafts. In this case, there is no relative movement between the differential pinion gears. However, when the vehicle turns, the differential pinion gears rotate on their respective shafts to speed up the rotation of one axle (outer wheel) whilst slowing down rotation of the other axle shaft (inner wheel).

In poor road conditions, i.e., slippery or rough road surfaces, the use of a differential can result in loss of control over the vehicle, since the differential mechanism always applies the same torque to both wheels. The maximum amount of torque that can be transferred by the wheels is limited to the greatest amount that will not make the wheels slip. Consequently, if one of the tires is on ice, all of the torque and speed will be transferred to the wheel on ice, leaving the tire spinning on the ice and stopping the vehicle from travelling forward.

As a solution to the aforementioned problem, differential locking mechanisms are known by the art that, when a wheel slips, allow some torque to be transferred to the non-slipping wheel. Such differential locking mechanisms essentially connect the two axle shafts together, such that the axle shafts rotate at the same speed even in poor road conditions. Differential locking mechanisms usually comprise an electric, pneumatic or hydraulic mechanism to lock the axle shafts together. This mechanism can either be activated manually by the vehicle driver or automatically by a control unit of the vehicle.

There are several types of differential lock mechanisms, such as the clutch type limited slip differential, viscous coupling, Torsen differentials and locking differentials. In case of a locking differential, a lock member, such as a shift collar, is provided that locks the gear housing to the axle shafts. The shift collar can be actuated by a differential lock actuator to engage or disengage with the gear housing, in response to a driver-controlled switch or automatic command. Once the shift collar engages with the gear housing, the differential is locked, thereby connecting the two axle shafts together.

Of course, it is desirable to unlock the differential as soon as normal road conditions are reached again. To this end, the shift collar is actuated in order to disengage from the gear housing, enabling the axle shafts to rotate at different speeds once again. It is a commonly known problem that the shift collar, which locks the gear housing to the axle shaft can get stuck to the gear housing and will not release the gear housing even if an automatic or driver controlled switch signal is present. For this reason, lock detection assemblies have been developed that sense the occurrence of a lock condition in a differential locking mechanism. These lock detection assemblies often facilitate a cam mechanism that indicates the position of a push rod of the actuator that is used to move the shift collar between its engaged/disengaged positions. The implementation of such cam assemblies is known to be time consuming and expensive, as very small tolerances need to be met. Furthermore, cam mechanisms are subject to wear and can, therefore, reduce the service life of the detector assembly.

SUMMARY

It is an object of the present invention to overcome the aforementioned problems and provide a differential lock actuator, which can sense the state of the differential locking mechanism, while being easily installed and exhibiting a longer service life. Moreover, it is another object of the present invention to provide a differential lock actuator that achieves the above stated objects, with no major re-design of the commonly known components. It is a more specific object of the present invention to provide a differential lock actuator that can be equipped with a lock detection assembly retrospectively.

The aforementioned objects of the present invention are accomplished by a differential lock actuator for a differential locking mechanism comprising a housing and a push rod configured to be moveable within the housing between a first position and a second position for activation/de-activation of a differential locking system, wherein the differential lock actuator further comprises a lock detection assembly adapted to detect a position of the push rod within the housing, wherein the lock detection assembly comprises a first detector component adapted to emit a magnetic field, said first detector component being attached to and movable together with the push rod.

The differential lock actuator of the present invention therefore utilizes a lock detection assembly, which is adapted to contactlessly monitor the position of the push rod within the housing. In contrast to the prior art cam solutions, this will significantly reduce wear of the detector assembly. As will be apparent from the descriptions below, the differential lock actuator of the present invention is also more compact and easier to manufacture than the commonly known technologies.

In another embodiment, the first detector component of the detection assembly is a magnet, preferably a permanent magnet. Although it is equally feasible to implement the first detector component as an induction coil, a magnet, particularly a permanent magnet is a small and energy efficient choice for the first detector component that can easily be attached to the push rod.

In another aspect of the present invention, the push rod and the first detector component of the detection assembly are translationally movable in a common direction, along a longitudinal axis of the housing. Accordingly, the movement of the push rod is not only used as a means to activate/deactivate the differential lock mechanism but, at the same time, facilitates the function of the lock detection assembly and greatly reduces the number of parts required.

In other embodiments of this invention, the push rod comprises a cavity on an outer surface, preferably a surface directed towards a removable part of the housing, said cavity being constructed to receive the first detector component of the detection assembly in such a manner that the first detector component is embedded within the push rod. In a particularly simple variant of this embodiment, the cavity may be provided as a blind hole on said outer surface of the push rod. The dimensions of the cavity are preferably such that the first detector component, for example a magnet, fits inside the cavity without protruding beyond said outer surface of the push rod. By embedding the first detector component within the cavity of the push rod, the first detector component is protected against wear and tear that might otherwise occur due to movement of the push rod within the housing.

Advantageously, the first detector component maybe removably attached within the aforementioned cavity, which facilitates replacement of the first component if servicing is required.

In another embodiment of the present differential lock actuator, the push rod is biased towards its first position, preferably by means of a compression spring. Accordingly, the push rod will remain in its first position until a force is applied in an opposite direction to the force of the compression spring. Once such a force is applied, preferably by means of compressed air, the push rod is moved from its first position into its second position, thereby actuating the differential lock. Once the actuating force has ceased the push rod will automatically be transferred back into its first position by means of the compression spring.

According to another embodiment, the housing comprises at least one air inlet for introduction of compressed air into the housing, said air inlet being arranged to enable displacement of the push rod from its first to its second position upon introduction of compressed air into the housing via said air inlet. It is, however, equivalently feasible to implement other ways of actuating the push rod, such as hydraulic fluids, for example.

In another embodiment, the push rod comprises opposite first and second end surface, the second end surface being oriented towards the air inlet, wherein the first detector component is attached to the second end surface of the push rod.

According to another aspect, the detection assembly further comprises a second detector component configured to detect the magnetic field of the first detector component. The second detector component may be attached to the housing of the differential lock actuator. Preferably, the second detector component is attached to a removable part of the housing, more preferable an air-inlet cap. In this regard, the air-inlet cap may comprise a cavity adapted to enclose the second detector component in such a way that the second detector component is separated from the push rod. According to this embodiment, the second detector component is placed inside the cap, thus will never be in direct contact with the push rod or the first detector component respectively. In contrast to the prior art cam solutions, this will significantly reduce wear of the lock detection assembly according to the present invention. Furthermore, cavity of the cap protects the first adaptor component from environmental influences, such as humidity.

In another disclosed embodiment, the second detector component comprises a reed switch connected to a circuit board and arranged to provide an electrical output signal when the push rod is in its first position. In this embodiment, the second detector component is constructed to detect a magnetic field that is emitted by first detector component that is attached to the push rod. In particular, the reed switch may be adjusted such that he magnetic field of the first detector component is only large enough to close the contacts of the reed switch when the push rod is in its first position. When the push rod is in its first position, the reed switch will recognize the magnetic field and close an electric circuit on the circuit board. This will generate an electric output signal that can be converted into a visual or acoustic feedback signal informing the driver about the state of the differential lock actuator/the differential lock.

According to another embodiment, the push rod is made of aluminum or polymer. Besides their light specific weight, these materials are generally non-magnetic, thus will not affect the magnetic field emitted by the first detector component.

The present invention further relates to a differential mechanism comprising a differential gear assembly with a gear housing and a differential locking mechanism comprising a lock member, said lock member being moveable between a first position, in which the lock member is arranged distant from the gear housing, and a second position, in which the lock member engages with the gear housing, wherein the differential mechanism further comprises a differential lock actuator as mentioned before.

The push rod of the differential lock actuator is preferably operably connected to the lock member such that the lock member is moved from its first position to its second position upon movement of the push rod from this first position to its second position and vice-versa. Such a connection between the push rod and the lock member can be achieved by means of a shift fork, for example.

Finally, the present invention further relates to vehicle axle comprising the aforementioned differential mechanism.

These and other features of the present invention can be best understood from the following specification and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
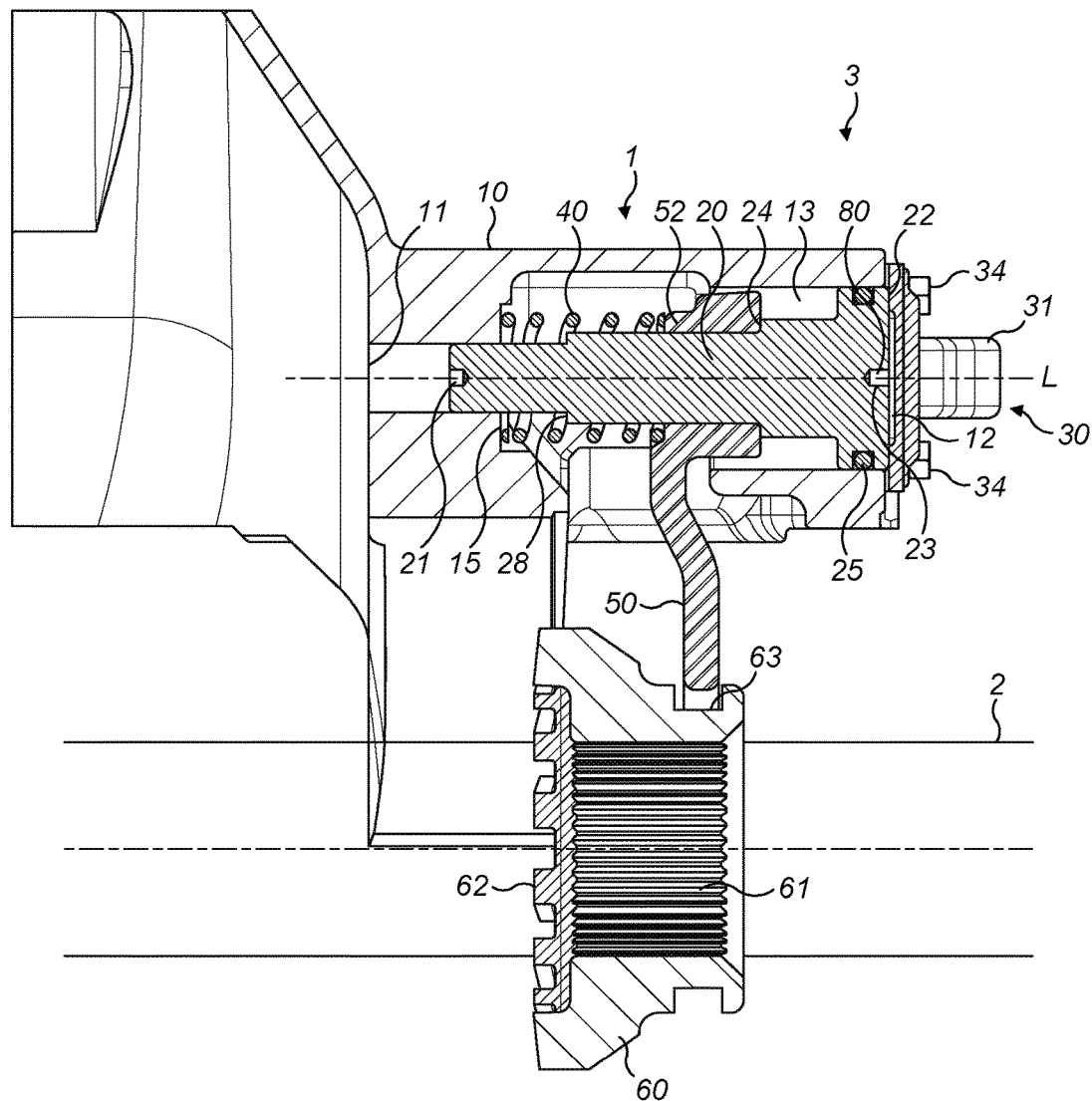
FIG. 1a is a cross-sectional view of a first embodiment of the differential lock actuator according to the present invention with a push rod in its first position.
Figure 1B:
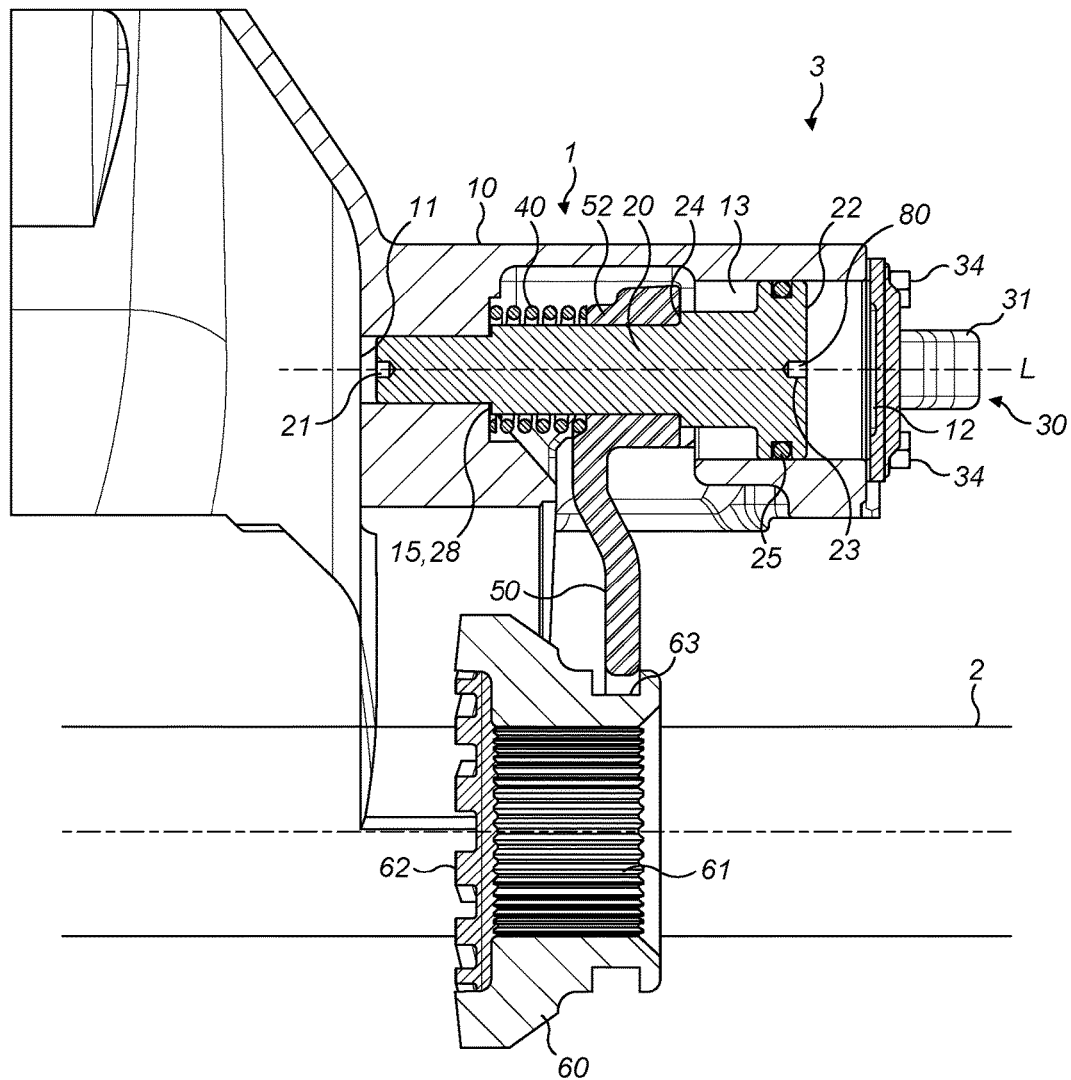
FIG. 1b is a cross-sectional view of the first embodiment with the push rod in its second position.

FIGS. 1a and 1b generally show a differential locking mechanism 3 in accordance with the first embodiment of the present invention. The differential locking mechanism 3 is moveable between an unlocked position (shown in FIG. 1a), in which the axle shafts 2 are able to rotate at different speeds and a locked position (shown in FIG. 1b) of the differential locking mechanism, in which the axle shafts 2 are locked together to rotate at a common speed. For this purpose, the differential locking mechanism 3 comprises a lock member 60, which can be moved between a first position, shown in FIG. 1a, and a second position, shown in FIG. 1b. The lock member 60 is constructed as a shift collar, that is, a generally ring-shaped structure which is adapted to be mounted on the outer surface of one of the axle shafts 2. To this end, the lock member 60 comprises a plurality of splines 61 constructed to cooperate with outer splines (not shown) of the axle shaft 2. The splines 61 enable the lock member to rotate together with the axle shaft, when the lock member is in its first or second position. At the same time, the splines 61 enable the lock member 60 (here a shift collar) to shift between its first and second position. In its unlocked position, shown in FIG. 1a, the lock member 60 is not engaged with the gear housing (not shown), thus the axle shaft 2 (and the lock member) can rotate at a speed different from the gear housing and the other axle shaft. If the lock member 60 is moved towards the gear housing, into its second position, the teeth 62 of the lock member 60 will engage with corresponding teeth (not shown) of the gear housing, thereby locking the axle shaft 2 and the lock member 60 with respect to the gear housing. In this second, locked position the axle shafts (only one shown at 2) will both rotate at the same speed as the gear housing.

As mentioned previously, the lock member 60 can be transferred from its first position into its second position by means of the differential lock actuator 1 that is also illustrated in FIGS. 1a and 1b. To this end, the differential lock actuator 1 is connected to the lock member 60 by means of a shift fork 50 which is designed to engage an annular groove 63 of the lock member 60. As will be explained in more detail below, the shift fork 50 further comprises an annular collar 52 which is attached to a circumferential surface of the push rod 20.

The differential lock actuator 1 comprises a hollow inner space 13 that extends between a first opening 11 and an opposite second opening 12. The generally cylindrical inner hollow space 13 is constructed to guide the push rod 20 along a longitudinal axis L of the substantially cylindrical housing 10. The substantially cylindrical push rod 20 comprises a cylindrical main body part extending between a first annular end surface 21 and a second annular end surface 22. The outer diameter of the generally cylindrical push rod 30 decreases in a step-wise fashion between the second annular end surface 22 and the first annular end surface 21, thereby providing several flange sections 24, 28, 29.

The push rod 20 can be moved between a first position, shown in FIG. 1a, and a second position, shown in FIG. 1b. In its first position, the larger second annular end surface 22 of the push rod is in alignment with the larger second opening 12 of the housing 10. In its second position, the second end surface 22 of the push rod 20 is located distant from the second opening 12, while a first annular flange 28 aligns with an annular stop surface 15 of the housing 10.

According to the embodiment shown in FIGS. 1a and 1b, the push rod 20 is biased towards the second opening 12 of the housing 10, which is covered by a removable part 30 that functions as a stop surface when the push rod 20 is in its first position. In other words, in its first position, the push rod 20 is pressed against the removable part 30 of the housing 10, which is constructed as a cap. The first position, thus, represents a rest position of the push rod 20. In order to transfer the push rod 20 from its first position to its second position, it is necessary to overcome the spring force of the compression spring 40, thereby compressing spring 40 and moving the push rod 20 towards the first opening 11 of the housing 10, until a first flange 28 aligns with a stopping surface 15 of the housing 10.

In the depicted embodiment, the push rod 20 is moved between its first and its second position by means of compressed air, which is introduced into the hollow inner space 13 via an air inlet 31 that forms part of the removable part 30. Compressed air that enters the hollow space 13 will impact on the larger second annular end surface 22 of the push rod 20 and hence drive the latter towards the first opening 11 at the opposite end of the housing 10, until the first annular flange 28 contacts the stop surface 15. The push rod 20 further comprises a sealing ring 25 that is received within an annular groove 26 of the push rod 20. The sealing ring 25 connects the push rod 20 with the inner wall of the hollow inner space 13 in an air tight manner, thereby facilitating build-up of air pressure between the air inlet 31 and the second end surface 22. Of course, it is equally feasible to move the push rod 20 between its second and first position by means of alternative actuators, such as hydraulic fluids and electromagnetism.

Figure 2:
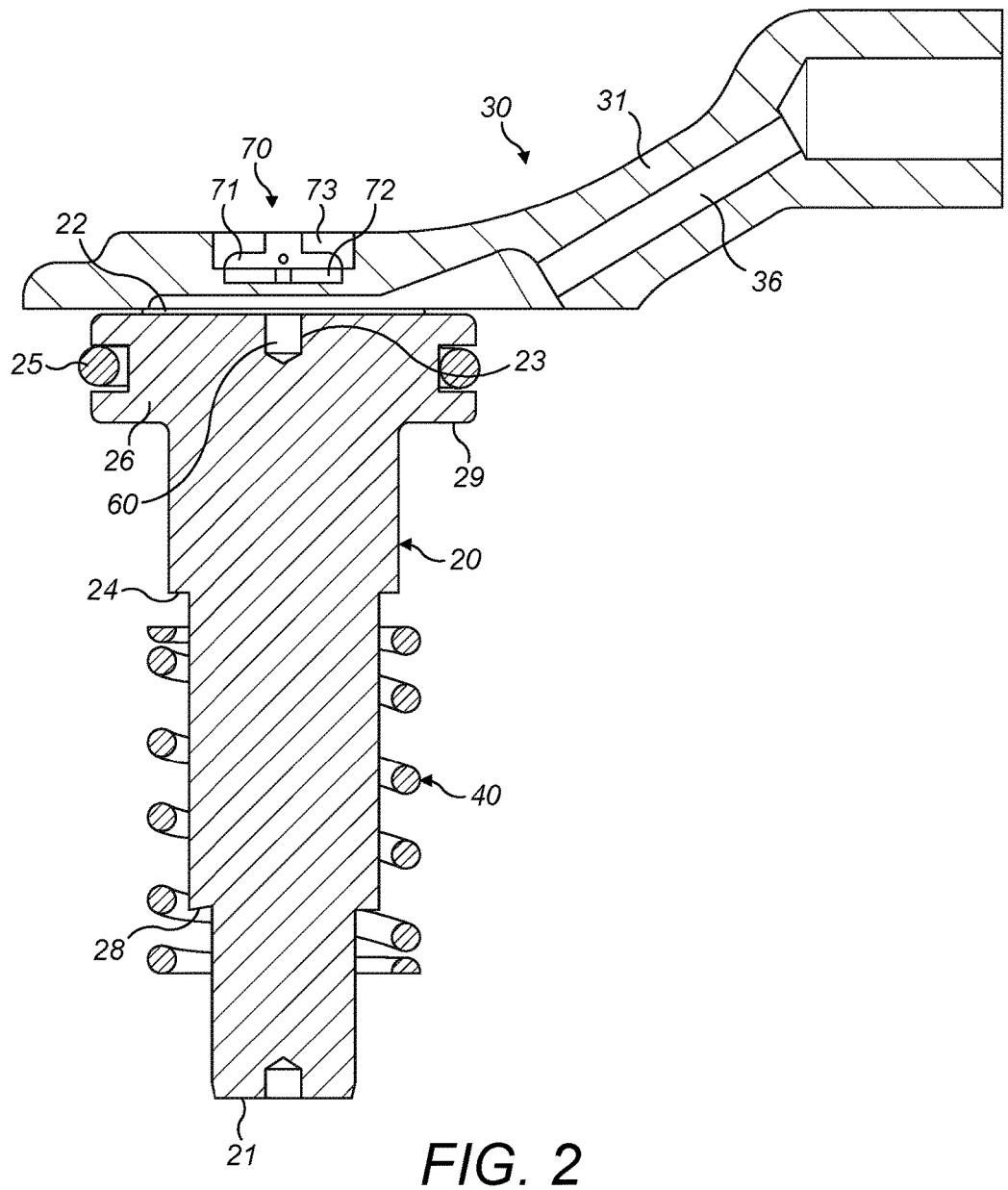
FIG. 2 is a cross-sectional view of the push rod and the removable part of the housing.

As mentioned before, it is desirable to know the position of the push rod 20 within the housing 10 in order to evaluate whether the differential locking mechanism is activated or deactivated. The differential lock actuator of the present invention therefore comprises a lock detection assembly adapted to detect a position of the push rod 20 within the housing 10, preferably at least the first position of the push rod. FIG. 2 shows a schematic sectional view of an exemplary lock detection assembly comprising a first and a second detector component 70, 80. The first detector component 80 is attached to the push rod 20, whereas the second detector component 70 is attached to the removable part 30 of the housing 10. In this particular example, the second detector component 70 of the lock detection assembly is constructed as a printed circuit board 72 that comprises a reed switch 71. The depicted removable part 30 is constructed as a cap that is adapted to cover the second opening 12 of the housing 10 (FIGS. 1a and 1b). The second detector component 70 is embedded inside a cavity 73 of the cap-like removable part 30 and located such that a magnetic field emitted by the first detector component 80 is sensed by the second detector component 70 when the push rod is in its first position (depicted in FIG. 2).

FIG. 2 shows that the cap-like removable part 30 not only houses the second detector component 70 but further comprises an air inlet 31 for introduction of compressed air into the hollow inner space 13 of the housing 10. The air inlet 31 comprises an air channel 36, which extends next to the cavity of the removable part 30 that houses the second detector component 70. The second detector component 70 is spatially separated from the air channel 36 within the removable part 30.

In the embodiment of FIG. 2, the first detector component 80 is attached to, and preferably embedded into, the push rod 20 such that the first detector component 80 is movable together with the push rod 20. The second detector component emits a magnetic field that can be recognized by the reed switch of the first detector component. In this particular embodiment, the first detector component 80 is a permanent magnet.

As illustrated, the first detector component 80 is received within a cavity 23 of the push rod 20 along the second annular surface 22. The first detector component 80 is attached within the cavity 23 such that it does not protrude the second annular surface 22. Accordingly, when the push rod 20 is in its first position, the reed switch 71 of the second detector component 70 recognizes the presence of the magnetic first detector component 80 and thus creates an electric output signal via the printed circuit board 72, which can be used to provide a visual or acoustic feedback to the driver. When the push rod 20 is moved from its first position (see FIGS. 1a and 2) to its second position (see FIG. 1b), the magnetic field emitted by the first detector component 80 is not strong enough to trigger the reed switch any longer. Consequently, the reed switch will disconnect the electric circuit of the printed circuit board 72, which can then be used as another output signal that will be fed back to the driver.

Figure 3:
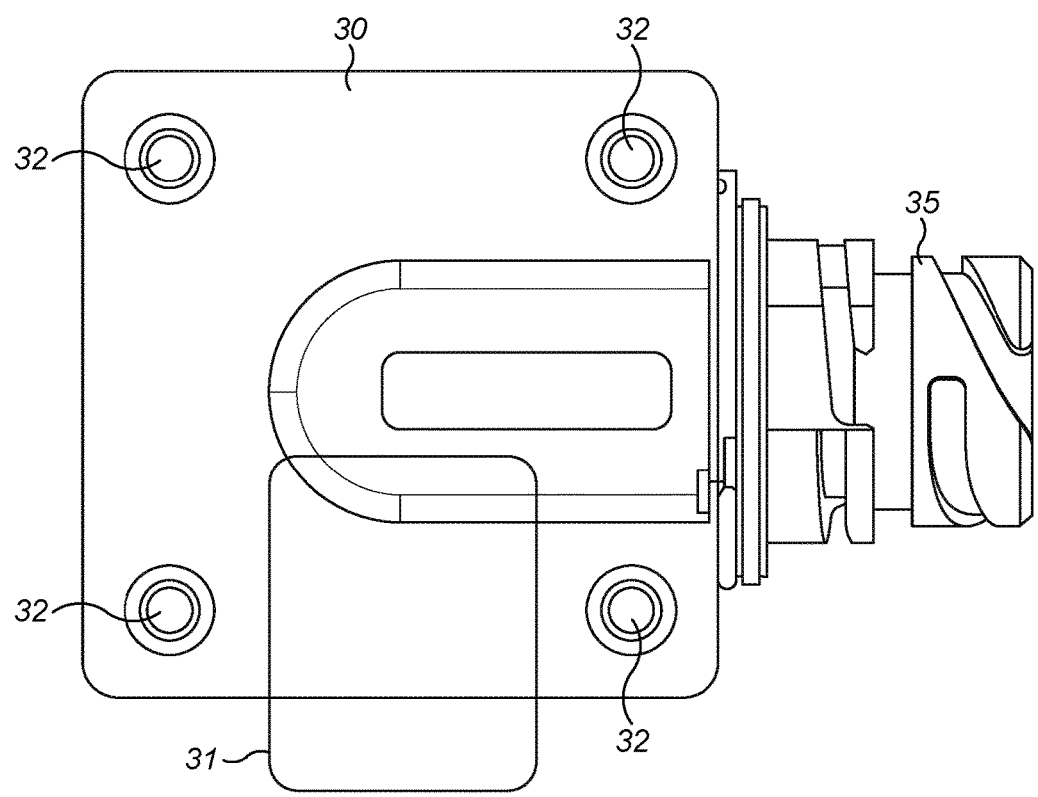
FIG. 3 is a schematic top view of the removable part of the housing in a disconnected state.

Due to the specific arrangement of the lock detection assembly shown in FIG. 2, the differential lock actuator 1 of the present invention exhibits a substantially longer service life than commonly known differential lock actuators with lock detection assemblies. This is due to the fact that the lock detection assembly does not require any direct contact between the first and the second detector components 70, 80. Furthermore, the present solution provides for easy replacement of the lock detection assembly since the second detector component 70 is embedded within the cap-like removable part 30 which is also illustrated in FIG. 3. The removable part 30 comprises a plurality of attachment holes 32 which can be used to attach the removable part 30 to the housing 10 by means of fastening members 34. The removable part 30 further comprises an electrical connector 35, which connects the printed circuit board of the first detector component with a power supply and feedback signal lines of the vehicle.

The invention has been described in great detail in the foregoing specification, it is believed that various other alterations and modifications to the invention will become apparent to those skilled in the art from a reading and understanding of the specification. It is intended that all such other alterations and modifications are included in the invention. In particular, it should be readily apparent to the person skilled in the art that the first and second detector components may equally be replaced by any other known contactless sensor arrangements, such as light sensors for example.

Further embodiments of the present disclosure are listed in the clauses below:

1. Differential lock actuator (1) for a differential locking mechanism, the Differential lock actuator (1) comprising: a housing (10); a push rod (20) configured to be movable within the housing (10) between a first position and a second position for activation/deactivation of a differential locking system; a lock detection assembly adapted to detect a position of the push rod (20) within the housing (10), wherein the lock detection assembly comprises a second detector component (70) connected to a removable part (30) of the housing (10).

2. The differential lock actuator (1) according to clause 1, wherein the removable part (30) of the housing (10) comprises at least one air inlet (31) for introduction of compressed air into the housing (10), said air inlet (31) being arranged to enable displacement of the push rod (20) from its first to its second position upon introduction of compressed air into the housing (10) via said air inlet.

3. The differential lock actuator (1) according to clause 1 or 2, wherein the housing (10) comprises a hollow inner space (13) adapted to guide the push rod (20) along a longitudinal axis of the housing (10), and wherein the removable part (30) of the housing (10) is a cap, adapted to cover an open side end of the housing (10).

4. The differential lock actuator (1) according to clause 3, wherein the cap comprises a cavity (37) adapted to enclose the second detector component (70) in such a way that the second detector component (70) is separated from the push rod (20).

5. The differential lock actuator (1) according to any one of clauses 1 to 4, wherein the removable part (30) of the housing (10) is attached to the housing (10) by means of a plurality of fastening members (34), preferably fastening screws.

6. The differential lock actuator (1) according to any one of clauses 1 to 5, wherein the second detector component (70) comprises a reed sensor (71) connected to a circuit board (72) and arranged to provide an electric output signal when the push rod (20) is in its first position.

7. The differential lock actuator (1) according to clause 6, wherein the circuit board is a printed circuit board (72).

8. The differential lock actuator (1) according to any one of clauses 1 to 7, wherein the lock detection assembly further comprises a first detector component (80) attached to the push rod (20), and wherein the second detector component (70) is adapted to detect the position of the first detector component (80) contactlessly.

9. The differential lock actuator (1) according to clause 8, wherein the first detector component (80) is adapted to emit a magnetic field, the first detector component (80) being attached to the push rod (20) such that the second detector component (70) detects the second detector component (80) when the push rod (20) is in its first position.

10. The differential lock actuator (1) according to clauses 9 or 10, wherein the push rod (20) comprises a cavity (23) on an outer surface, preferably a surface directed towards the removable part (30) of the housing (10), said cavity being constructed to receive the first detector component (80) of the detection assembly in such a manner that the first detector component (80) is embedded within the push rod (20).

11. The differential lock actuator (1) according to any one of clauses 1 to 10, wherein the push rod (20) is biased towards its first position, preferably by means of a compression spring (40).

12. Differential mechanism comprising: a differential gear assembly comprising a gear housing; a differential locking mechanism comprising a lock member (60), said lock member (60) being movable between a first position, in which the lock member is arranged distant from the gear housing, and a second position, in which the lock member engages with the gear housing, wherein the differential mechanism further comprises a differential lock actuator (1) according to any one of clauses 1 to 11.

13. Differential mechanism according to clause 12, wherein the push rod (20) of the differential lock actuator (1) is operably connected to the lock member such that the lock member is moved from its first position to its second position, upon movement of the push rod (20) from its first position to its second position and vice versa.

14. Differential mechanism according to clause 13, wherein the differential lock actuator (1) is connected to the lock member by means of a shift fork.

15. Vehicle axle comprising a differential mechanism according to any one of clauses 12 to 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential lock actuator for a differential locking mechanism, the differential lock actuator comprising:
    a housing;
    a push rod that is movable within the housing between a first position and a second position for activation/deactivation of a differential locking system; and
    a lock detection assembly that detects a position of the push rod within the housing, wherein the lock detection assembly has a first detector component that emits a magnetic field, the first detector component being attached to and movable together with the push rod.

2. The differential lock actuator of claim 1 wherein the first detector component is a magnet.

3. The differential lock actuator of claim 1 wherein the first detector component is a permanent magnet.

4. The differential lock actuator of claim 1 wherein the push rod and the first detector component are translationally movable in a common direction along a longitudinal axis of the housing.

5. The differential lock actuator of claim 1 wherein the push rod further comprises a cavity on an outer surface, the cavity being constructed to receive the first detector component such that the first detector component is embedded within the push rod.

6. The differential lock actuator of claim 5 wherein the first detector component is removably attached within the cavity of the push rod.

7. The differential lock actuator of claim 1 wherein the push rod is biased towards the first position.

8. The differential lock actuator of claim 7 further comprising a compression spring that biases the push rod toward the first position.

9. The differential lock actuator of claim 1 wherein the housing further comprises an air inlet that introduces compressed air into the housing, the air inlet being arranged to enable displacement of the push rod from the first to the second position upon introduction of compressed air into the housing via the air inlet.

10. The differential lock actuator of claim 9 wherein the push rod further comprises first and second end surfaces that are disposed opposite each other, the second end surface being oriented towards the air inlet and the first end surface, wherein the first detector component is attached to the second end surface of the push rod.

11. The differential lock actuator of claim 1 wherein the lock detection assembly further comprises a second detector component that detects the magnetic field of the first detector component.

12. The differential lock actuator of claim 11 wherein the second detector component is attached to the housing.

13. The differential lock actuator of claim 11 wherein the second detector component further comprises a reed sensor.

14. The differential lock actuator of claim 1 wherein the push rod is made of aluminum or a polymer.

15. A differential mechanism comprising:
    a differential gear assembly having a gear housing; and
    a differential locking mechanism having a lock member, the lock member being movable between a first position in which the lock member is arranged distant from the gear housing, and a second position in which the lock member engages with the gear housing, wherein the differential mechanism further comprises a differential lock actuator that includes:
        a housing;
        a push rod that is movable within the housing between a first position and a second position for activation/deactivation of a differential locking system; and
        a lock detection assembly that detects a position of the push rod within the housing, wherein the lock detection assembly has a first detector component that emits a magnetic field and is attached to and movable together with the push rod.

16. The differential mechanism of claim 15 wherein the push rod is operably connected to the lock member such that the lock member is moved from its first position to its second position upon movement of the push rod from its first position to its second position and vice versa.

17. The differential mechanism of claim 16 wherein the push rod is operably connected to the lock member by way of a shift fork.

18. A vehicle axle comprising:
    a differential mechanism that includes:
        a differential gear assembly having a gear housing; and
        a differential locking mechanism having a lock member, the lock member being movable between a first position in which the lock member is arranged distant from the gear housing, and a second position in which the lock member engages with the gear housing, wherein the differential mechanism further comprises a differential lock actuator that includes:
            a housing;
            a push rod that is movable within the housing between a first position and a second position for activation/deactivation of a differential locking system; and
            a lock detection assembly that detects a position of the push rod within the housing, wherein the lock detection assembly has a first detector component that emits a magnetic field and is attached to and movable together with the push rod.

* * * * *